United States Patent Office 3,226,446
Patented Dec. 28, 1965

3,226,446
HYDROXYBENZYLOXY-AMINE DERIVATIVES
David John Drain, Welwyn Garden City, Haydn Windsor Richard Williams, Digswell, Welwyn, and John Gordon Bernard Howes, Bengeo, Hertford, England, assignors to T. J. Smith & Nephew Limited, Kingston-upon-Hull, England, a British company
No Drawing. Filed Oct. 31, 1961, Ser. No. 149,829
Claims priority, application Great Britain, Nov. 3, 1960, 37,758/60; Oct. 10, 1961, 36,267/61
11 Claims. (Cl. 260—621)

The present invention relates to hydroxylamine derivatives and to process for their preparation.

It is an object of the invention to provide new and useful hydroxylamine derivatives.

It is a further object of the invention to provide compounds which are inhibitors of the enzymes responsible for the decarboxylation of 3,4-dihydroxyphenylalanine (DOPA) and 5-hydroxytryptophan (5 HTP).

It is a further object of the invention to provide compounds which, when administered to mammals, will have an effect on the central nervous system.

We have now discovered that certain hydroxylamine derivatives are potent inhibitors of the enzymes responsible for the decarboxylation of 3,4-dihydroxyphenylalanine (DOPA) and 5-hydroxytryptophan (5 HTP) both in vitro and in vivo and, when administered to mammals, have an effect on the central nervous system.

These hydroxylamine derivatives are believed to be new compounds and have the following general formula:

(I)    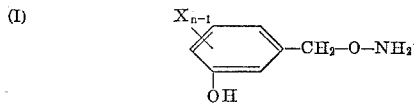

wherein
X represents a halogen atom, and
$n$ represents a positive integer from 1 to 4.

The hydroxylamine derivatives of the present invention can conveniently be used in the form of their acid-addition salts and the invention includes, as new compounds, hydroxylamine derivatives of the general Formula I given above, and their acid-addition salts.

The acid-addition salts may be the salts of, for example, hydrochloric acid.

The novel hydroxylamine derivatives of general Formula I above can be made by reacting at least two molecular proportions of hydrazine with a benzyloxyphthalimide of the following general formula:

(II)   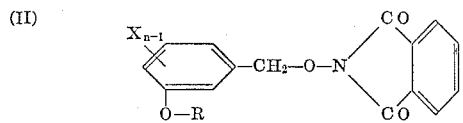

wherein
X and $n$ have the values given above, and
R represents an alkylcarbonyl or arylcarbonyl radical, such as acetyl or benzoyl.

During this reaction the phthaloyl group and the radical R are split off by what may be termed hydrazinolysis.

The novel hydroxylamine derivatives of general Formula I above can also be made by reacting hydrazine with a benzyloxyphthalimide of the following general formula:

(III)   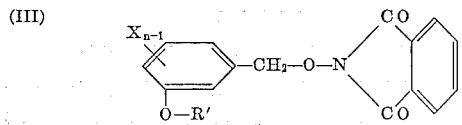

wherein
X and $n$ have the values given above, and
R' represents an alkylsulphonyl or arylsulphonyl radical, such as benzene sulphonyl,
and then hydrolysing off the R' radical.

In this second process, the phthaloyl group is split off by hydrazinolysis but a further hydrolysis step, preferably with alkali metal hydroxide, is required to remove the alkylsulphonyl or arylsulphonyl group.

The hydrazine is preferably used in the form of hydrazine hydrate.

The hydroxylamine derivative formed by either process can be converted to an acid-addition salt by methods known per se. For example, it can be converted to the hydrochloride by reaction with ethanolic hydrogen chloride.

The reactions employed in preparing the compounds of Formulae I, II and III may be shown diagrammatically as follows (X, $n$, R and R' having the meanings given above):

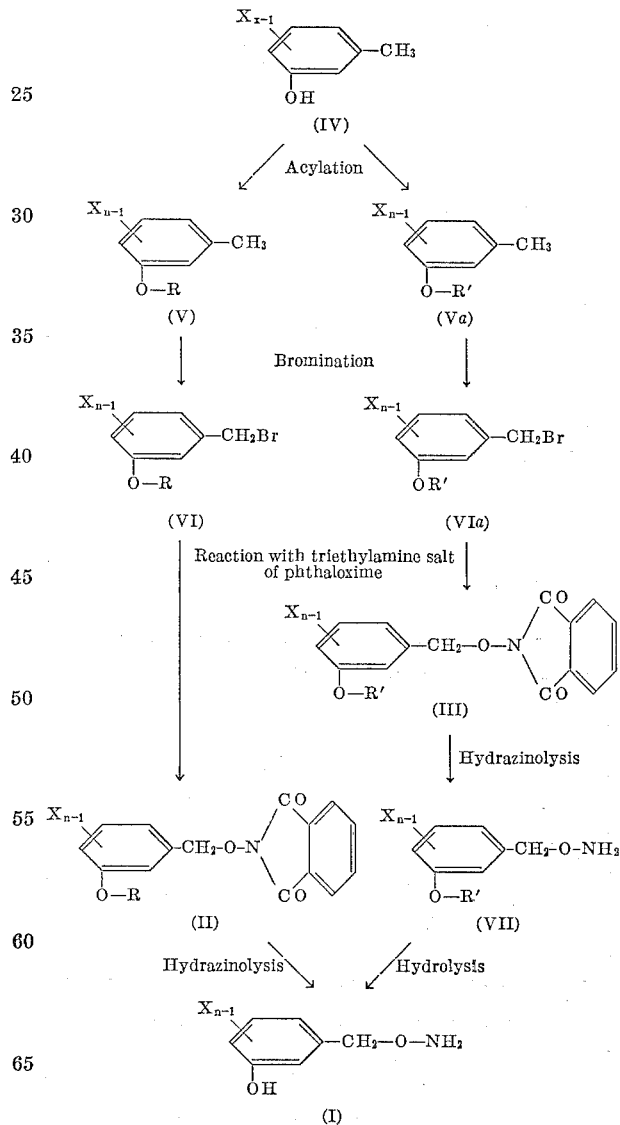

The carrying out of these reactions may be accomplished by the procedure described in the following examples, to which the invention is not limited. In these examples all temperatures are in degrees centigrade.

EXAMPLE 1

3-acetoxy-benzyl bromide

A solution of bromine (196.5 gm., 1.225 moles) in carbon tetrachloride (400 ml.) was added dropwise to a refluxing solution of m-tolyl acetate (184 gm., 1.225 moles) in carbon tetrachloride (800 ml.), over 4.5 hrs. Throughout the addition the mixture was irradiated with a 500 w. unfrosted tungsten projector bulb.

The solution was cooled and the solvent distilled under reduced pressure. The residue was carefully fractionated using a 50 cm. helix-packed-column, giving, after a fore-run of m-tolyl acetate, m-acetoxy-benzyl bromide, as a colourless oil, B.P. 138–150°/14 mm. On redistillation, the whole fraction had B.P. 97–9°/0.15 mm. giving a negligible still residue.

N-(3-acetoxy-benzyloxy)phthalimide m-Acetoxy-benzyl bromide (4.6 gm., 0.02 mole) was added to the red solution obtained by dissolving phthaloxime (3.25 gm., 0.02 mole) and triethylamine (2.02 gm., 0.02 mole) in acetonitrile (20 ml.). The solution was heated to reflux for 15 mins. by which time the colour had been discharged. On cooling, a solid precipitated, which was separated by filtration. The filtrate was evaporated to dryness under reduced pressure, and the solid residue combined with the original solid. After washing with water to remove triethylamine hydrobromide the water-insoluble solid was recrystallised from ethanol to give N-(3-acetoxy-benzyloxy)phthalimide (4.22 gm. 67.5%) as colourless plates, M.P. 113°.

3-hydroxybenzyloxy-amine hydrochloride

A solution of N-(3-acetoxy-benzyloxy)phthalimide (3.11 gm., 0.01 mole) and 100% hydrazine hydrate (1.5 gm., 0.03 mole) in ethanol (40 ml.) was boiled under reflux (2 hrs.). The mixture was cooled, isopropanolic HCl (10.2 ml., containing 0.25 gm. HCl/ml.) added, and the mixture heated to reflux (15 mins.). The cooled mixture was filtered, the filtrate evaporated to a small volume (c. 10 ml.) under reduced pressure, cooled, and precipitated solid (mainly hydrazine dihydrochloride) filtered off. The filtrate was evaporated to dryness, giving a white solid which was washed with water (20 ml.), leaving a small insoluble residue. The aqueous filtrate was evaporated to dryness, and the residue recrystallised twice from glacial acetic acid to give 3-hydroxybenzyloxy-amine hydrochloride (1.2 gm., 69%) as colourless needles, M.P. 168.5–169°.

EXAMPLE 2

3-benzoyloxy-2,4,6-tribromo-benzyl bromide

To a boiling solution of 3-benzoyloxy-2,4,6-tribromo-toluene (44 gm., 0.098 mole) in carbon tetrachloride (200 ml.) was added a solution of bromine (15.7 gm., 0.098 mole) in carbon tetrachloride (100 ml.) at such a rate that a permanent colour did not develop. The reaction mixture was irradiated with a 500 watt, unfrosted tungsten projector bulb to catalyse the bromination. Removal of the solvent under reduced pressure gave a viscous oil which crystallised on leaving overnight, M.P. 112–114°. Recrystallisation from ethanol yielded 37.7 gm. (73%), M.P. 116–7°. A further recrystallisation from ethanol did not further raise the melting point.

N-(3-benzoyloxy-2,4,6-tribromo-benzyloxy)phthalimide

A solution of 3-benzoyloxy-2,4,6-tribromo-benzyl bromide (5.28 gm., 0.01 mole), phthaloxime (1.63 gm., 0.01 mole) and triethylamine (1.01 gm., 0.01 mole) in acetonitrile (20 ml.) was boiled under reflux until the red colour was discharged (15 mins.). On cooling, a colourless precipitate was obtained, which was filtered off, washed with water, dried and recrystallised from glacial acetic acid to give N-(3-benzoyloxy-2,4,6-tribromo-benzyloxy)phthalimide (4.3 gm., 71%) as colourless needles, M.P. 168–9°. Further recrystallisation from glacial acetic acid did not raise the melting point.

2,4,6-tribromo-3-hydroxybenzyloxy amine

N - (3 - benzoyloxy-2,4,6-tribromo-benzyloxy)phthalimide (12.2 gm. 0.02 mole) was added to a solution of 100% hydrazine hydrate (3 gm., 0.06 mole) in ethanol (75 ml.) and the suspension heated to reflux. After a short time the mixture became clear, and solid began to reprecipitate. After heating for 2½ hrs. the mixture was cooled, and isopropanolic HCl (16 ml. containing 0.25 gm. HCl/ml.) was added. The mixture was then heated to reflux for 15 mins., cooled and filtered. The filtrate was evaporated to dryness under reduced pressure, the solid residue washed with ether, and dissolved in 2 N sodium hydroxide solution. Acidification to pH 4 with acetic acid gave a white precipitate of crude 2,4,6-tribromo-3-hydroxy benzyloxy-amine, which was recrystallised from aqueous methanol to give pale pink needles, M.P. 165–6°. Yield 5.15 gm. (68%).

2,4,6 - tribromo-3-hydroxybenzyloxy-amine hydrochloride was prepared by dissolving the base in ethanol containing an excess of isopropanolic HCl, and dilution with ether. Recrystallisation from glacial acetic acid gave the product as colourless needles, M.P. 222–3° (dec.).

EXAMPLE 3

3-benzoyloxy-6-chloro-benzyl bromide

N-bromo-succinimide (7.12 gm., 0.04 mole) was added to a solution of 3-benzoyloxy-6-chloro-toluene (9.86 gm., 0.04 mole) and benzoyl peroxide (0.05 gm.) in carbon tetrachloride (100 ml.), and the suspension boiled under reflux for 8 hrs. The mixture was cooled, succinimide filtered off, and the filtrate evaporated under reduced pressure to leave an oily residue (13 gm.) which solidified overnight at 0°. Two recrystallisations from methanol/charcoal gave 3-benzoyloxy-6-chloro-benzyl bromide (3.05 gm., 23%) as pale yellow needles, M.P. 69–70°.

N-(3-benzoyloxy-6-chloro-benzyloxy)-phthalimide

A solution of 3-benzoyloxy-6-chloro-benzyl bromide (3 gm., 0.009 mole), phthaloxime (1.51 gm., 0.009 mole) and triethylamine (0.925 gm., 0.009 mole), in acetonitrile (25 ml.) was boiled under reflux until the red colour was discharged (30 mins.). On cooling, a colourless precipitate was obtained, which was filtered off, washed with water, dried and recrystallised from glacial acetic acid to give N - (3 - benzoyloxy-6-chloro-benzyloxy)phthalimide (3.2 gm., 85%) as colourless micro-prisms, M.P. 170–171°.

2-chloro-5-hydroxybenzyloxy-amine hydrochloride

A solution of N-(3-benzoyloxy-6-chlorobenzyloxy)-phthalimide (2.5 gm., 0.0062 mole) and 100% hydrazine hydrate (0.92 gm., 0.0186 mole) in ethanol (40 ml.) was boiled under reflux for 2½ hours. After cooling somewhat, isopropanolic HCl (9 ml.=2.25 gm. HCl) was added, the suspension refluxed for a further 15 minutes, cooled, and the solid removed by filtration. The filtrate was evaporated to dryness under reduced pressure, the residue dissolved in 2 N HCl (25 ml.), filtered from a small insoluble residue, and again evaporated to dryness under reduced pressure. The residue (2 gm.) was dissolved in water (15 ml.), taken to pH 10 with 2 N NaOH, and then to pH 4 with dilute acetic acid. The precipitate was filtered off, dried, and dissolved by warming with excess isopropanolic HCl (5 ml.=1.2 gm. HCl). Addition of ether precipitated the hydrochloride as colourless prisms, M.P. 168–70°. Recrystallisation from glacial acetic acid gave 0.9 gm. (70%), M.P. 171–2°.

EXAMPLE 4

3-benzoyloxy-4,6-dibromo-benzyl bromide

N-bromo-succinimide (1.44 gm., 0.0081 mole) was added to a solution of 3-benzoyloxy-4,6-dibromo-toluene (3 gm., 0.0081 mole) and benzoyl peroxide (0.02 gm.) in carbon tetrachloride (50 ml.), and the suspension boiled under reflux for 2½ hours. The mixture was cooled, succinimide filtered off, and the filtrate evaporated under reduced pressure to leave an oil which solidified. Two recrystallisations from methanol gave 3-benzoyloxy-4,6-dibromobenzyl bromide (1.8 gm., 50%) as colourless needles, M.P. 88–9°.

*N-(3-benzoyloxy-4,6-dibromo-benzyloxy)phthalimide*

A solution of 3-benzoyloxy-4,6-dibromo-benzyl bromide (1.5 gm.; 0.0033 mole), phthaloxime (0.545 gm.; 0.0033 mole) and triethylamine (0.335 gm.; 0.0033 mole) in acetonitrile (10 ml.) was boiled under reflux for 30 mins. On cooling, a colourless solid precipitated, which was filtered off, washed with water, dried and recrystallised from glacial acetic acid to give N-(3-benzoyloxy-4,6-dibromo-benzyloxy)-phthalimide (0.9 gm., 50%) as a colourless microcrystalline solid, M.P. 175–6°.

*2,4-dibromo-5-hydroxybenzyloxy-amine*

A solution of N-(3-benzoyloxy-4,6-dibromo-benzyloxy)-phthalimide (0.85 gm.; 0.0016 mole) and 100% hydrazine hydrate (0.24 gm.; 0.005 mole) in ethanol (10 ml.) was boiled under reflux for 2½ hrs. After cooling to about 50°, isopropanolic HCl (2.5 ml. =0.625 gm. HCl) was added, and the resultant suspension heated to reflux for 15 minutes and allowed to cool to room temperature. The precipitate was filtered off, the filtrate evaporated under reduced pressure, and the solid residue dissolved in 2 N HCl (30 ml.) and filtered from a small insoluble residue. The filtrate was taken to pH 10 with 2 N NaOH, and then to pH 4 with dilute acetic acid, the precipitate filtered off, washed with water and dried, to give 2,4-dibromo-5-hydroxybenzyloxy-amine (0.4 gm.), M.P. 197–8°.

The hydrochloride was prepared by dissolving the base (0.4 gm.) in ethanol (3 ml.) and addition of isopropanolic HCl (2 ml. =0.5 gm. HCl). By addition of ether (200 ml.) the hydrochloride slowly precipitated as colourless micro-needles, M.P. 200° (dec.). One recrystallisation from glacial acetic acid gave 0.28 gm. (52%), M.P. 201–2 (dec.).

EXAMPLE 5

*3-benzoyloxy-6-bromo-benzyl bromide*

A solution of bromine (60 gm., 0.375 mole) in carbon tetrachloride (400 ml.) was added dropwise to a gently refluxing solution of 3-benzoyloxy-6-bromo-toluene (109 gm., 0.375 mole) in carbon tetrachloride (500 ml.) at such a rate that a permanent colour did not develop (3 hrs.). The reaction mixture was irradiated with a 500 watt unfrosted tungsten projector bulb throughout.

The cooled solution was evaporated under reduced pressure, the residue dissolved in a mixture of chloroform (35 ml.) and 60–80° petroleum ether (120 ml.), filtered and cooled to 0° C. The crystalline precipitate was filtered and recrystallised from methanol to give 3-benzoyloxy-6-bromo-benzyl bromide (65.3 gm., 47%) as colourless needles, M.P. 91–92.5°.

*N-(3-benzoyloxy-6-bromo-benzyloxy)phthalimide*

A solution of 3-benzoyloxy-6-bromo-benzyl bromide (9 gm., 0.024 mole), phthaloxime (3.96 gm., 0.024 mole) and triethylamine (2.46 gm., 0.024 mole) in acetonitrile (40 ml.) was boiled under reflux until the red colour was discharged (45 mins.). The solution was cooled, the resultant precipitate filtered, washed with methanol, and recrystallised from glacial acetic acid to give N-(3-benzoyloxy-6-bromo-benzyloxy)phthalimide (9.1 gm., 83%) as small colourless needles, M.P. 155°.

*2-bromo-5-hydroxybenzyloxy-amine*

N-(3-benzoyloxy-6-bromo-benzyloxy)phthalimide (7.7 gm., 0.017 mole) was added to a solution of 100% hydrazine hydrate (2.56 gm., 0.051 mole) in ethanol (75 ml.), and the mixture heated to reflux (2½ hrs.). The mixture was cooled, ethanolic hydrogen chloride (30 ml.=7 gm. HCl) added, and the mixture allowed to stand at room temperature for 1 hr. The precipitate was filtered off, the filtrate evaporated to dryness, the residue triturated with ether, filtered, the solid dissolved in 2 N HCl (100 ml.), filtered, and the filtrate again evaporated to dryness. The solid residue (6.7 gm.) was suspended in water (45 ml.), taken to pH 10 with 5 N sodium hydroxide solution (clear solution obtained) and then to pH 4.5 with acetic acid. The suspension was chilled to −10° for 1 hr. and the product filtered off and dried (3.1 gm., M.P. 94–6°).

The above product was dissolved in excess ethanolic HCl, evaporated to dryness, and the residue recrystallised from glacial acetic acid to give 2-bromo-5-hydroxy-benzyloxyammonium chloride (2.5 gm., 58%) as a colourless microcrystalline solid, M.P. 184–5° (dec.).

EXAMPLE 6

*3-benzenesulphonyloxy-4-chloro-benzyl bromide*

3-benzenesulphonyloxy-4-chloro-toluene (108 gm., 0.383 mole) was dissolved in carbon tetrachloride (250 ml.), and bromide vapour (61.5 gm., 0.383 mole) passed into the gently refluxing solution in a slow stream of dry nitrogen over 9 hrs. The solution was irradiated by means of a 500 watt, unfrosted, tungsten projector bulb. The solution was filtered hot, cooled to 0° and the precipitate filtered off, dried and recrystallised from methanol (5 parts v./w.) to give 3-benzenesulphonyloxy-4-chloro-benzyl bromide (54.35 gm., 40%) as colourless needles, M.P. 103.5–105°.

*N-(3-benzenesulphonyloxy-4-chloro-benzyloxy) phthalimide*

A solution of 3-benzenesulphonyloxy-4-chloro-benzyl bromide (10 gm., 0.028 mole), phthaloxime (4.54 gm., 0.028 mole) and triethylamine (2.8 gm., 0.028 mole) in acetonitrile (100 ml.) was boiled under reflux until the red colour was discharged (1 hr.). The solution was chilled to −10° for 1 hr., the precipitate filtered, washed with water and ethanol and dried, giving 8.75 gm., M.P. 164.5–165.5°.

Evaporation of the filtrate gave solid, which, after washing with water and ethanol and recrystallisation from acetonitrile (25 ml.) had M.P. 164–5° (1.35 gm.). Further recrystallisation of both crops did not raise the M.P.

The total yield of N-(3-benzenesulphonyloxy-4-chloro-benzyloxy)phthalimide was 10.1 gm. (82%).

*3-benzenesulphonyloxy-4-chloro-benzyloxyamine*

N-(3-benzenesulphonyloxy-4-chloro-benzyloxy)-phthalimide (9.3 gm., 0.021 mole) was added to a solution of 100% hydrazine hydrate (1.05 gm., 0.021 mole) in ethanol (100 ml.), and the mixture heated to reflux (1.5 hr.). The suspension was cooled, filtered, and the filtrate evaporated to dryness. The residue was dissolved in chloroform (100 ml.), filtered, and the filtrate evaporated, giving a residue which on trituration with 60–80° pet. ether (75 ml.) gave crude 3-benzenesulphonyloxy-4-chloro-benzyloxyamine (6.1 gm.), M.P. 44–6°, which was not further purified.

*4-chloro-3-hydroxybenzyloxy-amine*

Crude 3-benzenesulphonyloxy-4-chloro-benzyloxy-amine (6.1 gm., 0.0195 mole) was added to a solution of potassium hydroxide (2.82 gm., 0.044 mole) in methanol (30 ml.). The mixture was warmed to reflux for 5 mins., left to stand (1 hr.), the precipitate filtered, washed with methanol (5 ml.), and the combined filtrate and washings evaporated under reduced pressure. The residue was dissolved in water (30 ml.) and acidified to pH 4 with acetic acid. The precipitate was filtered, dried, dissolved in a slight excess of 5 N ethanolic HCl, and the resulting solution filtered into ether (200 ml.), giving 4-chloro-3-hydroxy-benzyloxy-ammonium chloride (2.4 gm., 59%) as colourless needles, M.P. 192.5–193.5° (dec.). Recrystallisation from glacial acetic acid did not raise the M.P.

EXAMPLE 7

*3-benzenesulphonyloxy-4-bromo-benzyl bromide*

A solution of bromine (49 gm., 0.306 mole) in carbon tetrachloride (100 ml.) was added dropwise to a gently refluxing solution of 3-benzenesulphonyloxy-4-bromo toluene (100 gm., 0.306 mole) in carbon tetrachloride (450 ml.) at such a rate that permanent colour did not develop (5 hrs.). The reaction mixture was irradiated with a 500 watt unfrosted tungsten projector bulb throughout.

The cooled solution was evaporated under reduced pressure, and the residue (136 gm.) used without further purification.

*N-(3-benzenesulphonyloxy-4-bromo-benzyloxy)phthalimide*

A solution of crude 3-benzenesulphonyloxy-4-bromo-benzyl bromide (122 gm., 0.295 mole), phthaloxime (48.2 gm., 0.295 mole and triethylamine (30 gm., 0.295 mole) in acetonitrile (500 ml.) was boiled under reflux for 3 hrs. The solution was evaporated under reduced pressure, and the residue recrystallised from ethanol (500 ml.) plus acetic acid (100 ml.) to give N-(3-benzenesulphonyloxy-4-bromo-benzyloxy)phthalimide (100 gm., 57%), M.P. 130–135°. After two recrystallisations from ethanol the product was obtained as colourless needles, M.P. 153.5–4° C.

*3-benzenesulphonyloxy-4-bromo-benzyloxyamine*

N-(3-benzenesulphonyloxy-4-bromo-benzyloxy) phthalimide (105 gm., 0.22 mole) was added to a solution of 100% hydrazine hydrate (17 gm., 0.33 mole) in ethanol (1 l.) and the mixture heated to reflux for 2 hours. The solution was evaporated to dryness under reduced pressure, and chloroform (300 ml.) added to the residue. The solution was filtered, and the filtrate evaporated to dryness. The residue was recrystallised from isopropanol (400 ml.) to give 3-benzenesulphonyloxy-4-bromo-benzyloxyamine (20.4 gm., 29%), M.P. 82.5–83.5° C. After two recrystallisations from isopropanol and product was obtained as prisms, M.P. 84–5°.

*4-bromo-3-hydroxybenzyloxy-amine*

3-benzenesulphonyloxy-4-bromo-benxyloxy-amine (3.58 gm., 0.01 mole) was added to a solution of potassium hydroxide (1.41 gm., 0.025 mole) in methanol (20 ml.), and the mixture warmed to reflux for 5 mins. The solution was filtered, the filtrate evaporated, the residue dissolved in water (25 ml.), and the solution acidified to pH 4 with acetic acid. The resultant precipitate was filtered off, dried, and dissolved in 8.3 N ethanolic HCl (1 ml.) and ethanol (4 ml.). The solution was filtered, and diluted with ether (50 ml.), giving a precipitate of 4-bromo-3-hydroxy-benzyloxyammonium chloride (1 gm., 39%), M.P. 202–3° (dec.). Recrystallistation from glacial acetic acid did not raise the M.P.

The invention is not limited to the preferred forms described above but is of the scope of the appended claims.

We claim:

1. A hydroxylamine derivative of the general formula:

(I) 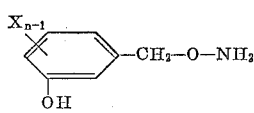

wherein

X represents a halogen atom, and
$n$ represents a positive integer from 1 to 4.

2. An acid-addition salt of a hydroxylamine derivative as claimed in claim 1.

3. The hydrochloride of a hydroxylamine derivative as claimed in claim 1.

4. A compound selected from the group consisting of 3-hydroxybenzyloxy-amine and its hydrochloride.

5. A compound selected from the group consisting of 2-chloro-5-hydroxybenzyloxy-amine and its hydrochloride.

6. A compound selected from the group consisting of 4-chloro-3-hydroxybenzyloxy-amine and its hydrochloride.

7. A compound selected from the group consisting of 4-bromo-3-hydroxybenzyloxy-amine and its hydrochloride.

8. The process for the preparation of a hydroxylamine derivative of the general formula:

(I) 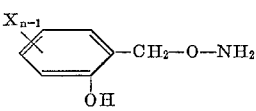

wherein

X represents a halogen atom, and
$n$ represents a positive integer from 1 to 4.

which comprises reacting at least two molecular proportions of hydrazine with a benzyloxyphthalimide of the general formula:

(II) 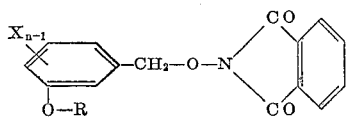

wherein

X and $n$ have the values given above, and
R represents an acyl radical selected from the group which consists of alkylcarbonyl and arylcarbonyl radicals.

9. The process as claimed in claim 8 in which the hydrazine is used in the form of hydrazine hydrate.

10. The process for the preparation of a hydroxylamine derivative of the general formula:

(I) 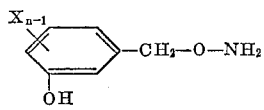

wherein

X represents a halogen atom, and
$n$ represents a positive integer from 1 to 4, which comprises reacting hydrazine with a benzyloxyphthalimide of the general formula:

(III) 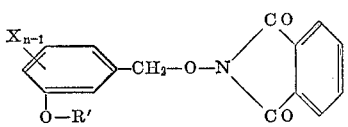

wherein

X and $n$ have the values given above, and
R' represents an acyl radical selected from the group which consists of alkylsulphonyl and arylsulphonyl radicals, and then hydrolysing off the R' radical.

11. The process as claimed in claim 10 in which the hydrazine is used in the form of hydrazine hydrate.

(References on following page)

References Cited by the Examiner

UNITED STATES PATENTS

| | | | |
|---|---|---|---|
| 2,225,619 | 12/1940 | Britton et al. | 167—31 |
| 2,233,407 | 3/1941 | Flett | 167—31 |
| 2,560,760 | 7/1951 | Faith | 260—623 |
| 2,843,635 | 7/1958 | Pennington | 260—623 |

OTHER REFERENCES

Mamalis et al.; Chem. Soc., Jour. (1960), pages 229–238 (10 pages).

LEON ZITVER, *Primary Examiner.*

CHARLES B. PARKER, *Examiner.*